(12) United States Patent
Sauvinet

(10) Patent No.: US 8,814,102 B2
(45) Date of Patent: *Aug. 26, 2014

(54) METHOD FOR REDUCING THE TAKEOFF RUN OF AN AIRCRAFT

(75) Inventor: Frédéric Sauvinet, Tournefeuille (FR)

(73) Assignee: Airbus Operations (SAS), Toulouse Cedex (FR)

(*) Notice: Subject to any disclaimer, the term of this patent is extended or adjusted under 35 U.S.C. 154(b) by 806 days.

This patent is subject to a terminal disclaimer.

(21) Appl. No.: 12/990,656

(22) PCT Filed: Apr. 30, 2009

(86) PCT No.: PCT/FR2009/000514
§ 371 (c)(1),
(2), (4) Date: Nov. 2, 2010

(87) PCT Pub. No.: WO2009/138596
PCT Pub. Date: Nov. 19, 2009

(65) Prior Publication Data
US 2011/0042526 A1    Feb. 24, 2011

(30) Foreign Application Priority Data

May 7, 2008   (FR) ...................... 08 02539

(51) Int. Cl.
*B64C 13/04* (2006.01)

(52) U.S. Cl.
USPC .......................................... 244/221

(58) Field of Classification Search
USPC ........ 244/221, 217, 183, 184, 195, 99.1, 75.1
See application file for complete search history.

(56) References Cited

U.S. PATENT DOCUMENTS

| 4,717,097 | A | 1/1988 | Sepstrup |
| 5,702,072 | A | 12/1997 | Nusbaum |
| 5,901,927 | A * | 5/1999 | Ho .................................. 244/183 |
| 6,554,229 | B1 * | 4/2003 | Lam et al. ..................... 244/217 |
| 7,367,530 | B2 * | 5/2008 | Harrigan et al. .............. 244/184 |
| 2009/0230253 | A1 | 9/2009 | Delaplace et al. |
| 2011/0029165 | A1 * | 2/2011 | Sauvinet ......................... 701/15 |

OTHER PUBLICATIONS

Written Opinion of the International Searching Authority, search completed Sep. 30, 2009 by the European Patent Office, for International Application No. PCT/FR2009/000514.

* cited by examiner

*Primary Examiner* — Valentina Xavier
(74) *Attorney, Agent, or Firm* — Novak Druce Connolly Bove + Quigg LLP

(57) ABSTRACT

The method of the invention comprises imparting to the flaps (6G, 6D) of said aircraft either a nose-up deflection ($\alpha_F$) corresponding to the maximum sharpness if the nose-up order is higher than a predetermined threshold, or a deflection ($\alpha_0$) corresponding to the minimum drag if the nose-up order is lower than said threshold.

5 Claims, 3 Drawing Sheets

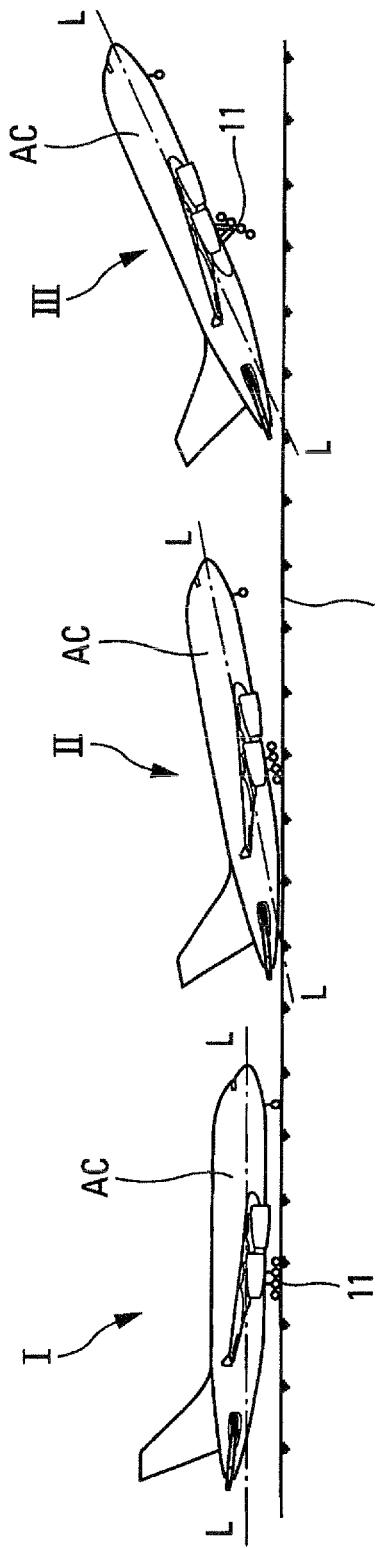
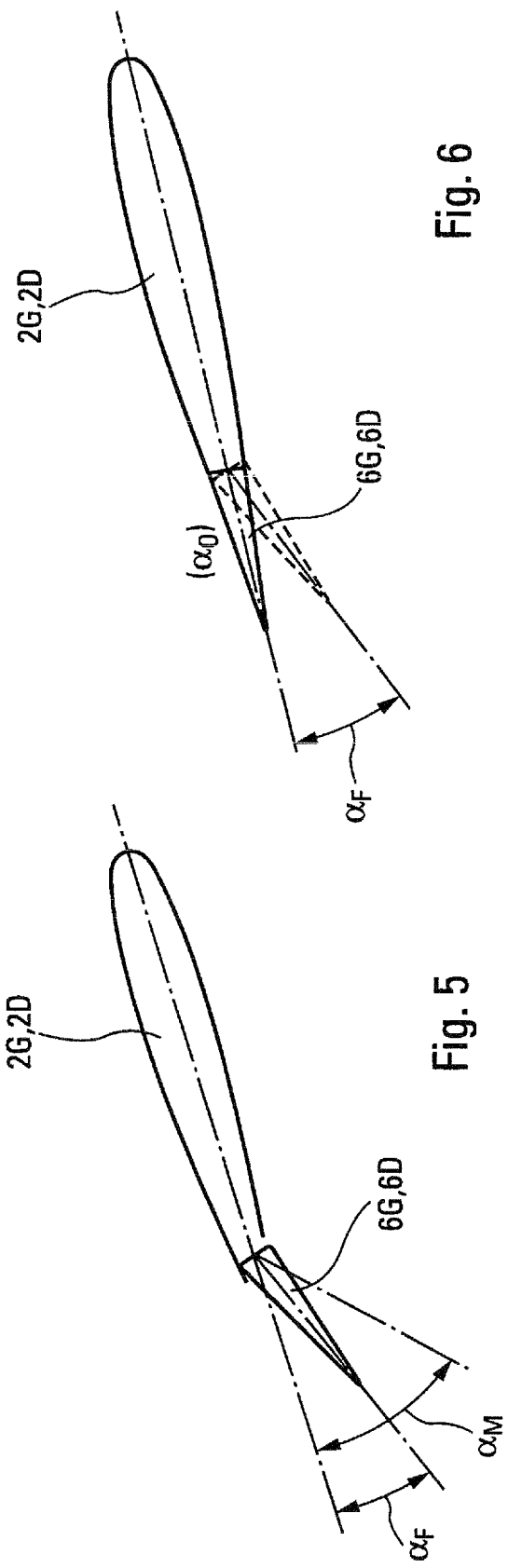

METHOD FOR REDUCING THE TAKEOFF RUN OF AN AIRCRAFT

CROSS-REFERENCE TO RELATED APPLICATIONS

This application is a §371 national stage entry of International Application No. PCT/FR2009/000514, filed Apr. 30, 2009, which claims priority to French patent application Ser. No. 08/02539, filed May 7, 2008, the entire contents of which are incorporated herein by reference.

FIELD OF THE INVENTION

The present invention relates to a method for reducing the takeoff run of an aircraft.

BACKGROUND OF THE INVENTION

It is known, that with a view to taking off, the leading edge slats, the flaps and the ailerons of an aircraft are imparted with a configuration optimizing the fineness (lift/drag ratio) of the latter, such that climbing slope becomes maximum. Now, in such a fineness optimization configuration, said ailerons occupy a position being partially deflected downwards. As a result, when the aircraft has an optimized fineness as soon as it has left the ground, the drag of said aircraft cannot be optimal as long as the latter runs while accelerating on the ground.

SUMMARY OF THE INVENTION

The present invention aims at overcoming such a drawback.

To this end, according to the invention, the method for reducing the takeoff run of an aircraft provided with at least one steering joystick, with ailerons supported by the wings of said aircraft and with mobile aerodynamic rudder surfaces, said takeoff run during which said aircraft runs on a takeoff runway while accelerating and at the end of which the pilot of said aircraft communicates to said steering joystick a strongly tilted nose-up takeoff position so that said mobile aerodynamic rudder surfaces cause said aircraft to take off, is remarkable in that:
  a tilting threshold is determined of said steering joystick being lower than said takeoff position, but sufficiently large to be representative of the pilot's will to perform the takeoff of said aircraft; and
  said ailerons are controlled so that they take:
    a symmetric position being partially deflected downwards corresponding to a maximum fineness for said aircraft, if the nose-up tilting of said steering joystick is higher than said tilting threshold, and
    a symmetric position being at least substantially close to that being in continuation of said wings and providing a minimum drag for said ailerons, if the nose-up tilting of said steering joystick is lower than said tilting threshold.

Thus, by means of the present invention, when the aircraft is in a running phase with a view for a real takeoff, the drag generated by said ailerons is removed until the pilot controls the takeoff, reducing the takeoff run. The runway length being necessary to take off could thus be reduced or, inversely, the aircraft can carry a larger load for a determined runway length.

It will be noticed that, although such an aileron drag removal during most of the running phase occurs to the detriment of the fineness of the aircraft, no adverse effect results therefrom for the aircraft, as the fineness is not an important parameter upon running.

It is known that, generally, said takeoff position of the steering joystick approximately corresponds to two thirds of the maximum stroke of said nose-up joystick. More particularly in such a case, a good value for said tilting threshold could correspond at least approximately to one third of such a maximum stroke.

While the operation of all units and devices of the aircraft is checked, before takeoff and in accordance with a predetermined operation list (check-list), the pilot could be caused to nose-up deflect said steering joystick while the aircraft is running at a low velocity. In order then to prevent the ailerons from switching from one of the positions to another with no reason, it is then advantageous that the implementation of the method of the present invention be subject to a velocity condition. Thus, according to another feature of the present invention, said ailerons can only take their minimum drag position if the velocity of the aircraft is higher than a predetermined velocity threshold, while they take their maximum fineness position if said velocity of the aircraft is lower than said velocity threshold. Such a velocity threshold could be of a few tens of kts, for example 40 kts.

Furthermore, it is known that, should the aircraft be off centred, the latter could takeoff with a low tilting amplitude of the steering joystick. Furthermore, for safety reasons, it is important that, on flight, the aircraft is with its ailerons in a maximum fineness position. Thus, according to still another feature of the present invention, said ailerons could only take their minimum drag position if the aircraft is on the ground, whereas they take their maximum fineness position as soon as the aircraft leaves the ground.

As a result from the foregoing, in a preferred embodiment of the method according to the present invention:
  said ailerons are controlled for taking their minimum drag position when the three following conditions are simultaneously met:
    the aircraft is on the ground,
    and the velocity of the aircraft is higher than said velocity threshold,
    and the tilting of said steering joystick is lower than said tilting threshold; and
  said ailerons are controlled so as to take their maximum fineness position, when at least one of the following conditions is met:
    the aircraft is on flight,
    or the velocity of the aircraft is lower than said velocity threshold,
    or the tilting of said steering joystick is higher than said tilting threshold.

For implementing the present invention, the following actions could be performed, which consist in:
  establishing
    a ground criterion, being equal to 1 when said aircraft is on flight and being equal to 0 when said aircraft is on the ground;
    a velocity criterion, being equal to 1 when the running velocity of said aircraft is lower than said velocity threshold and being equal to 0 when said running velocity is higher than said velocity threshold; and
    a steering joystick criterion, being equal to 1 should the nose-up tilting of said joystick is higher than said tilting threshold and being equal to 0 if said nose-up tilting is lower than said tilting threshold; and addressing each of the three criteria at a respective input of an OR logic gate or similar, the outlet of which controls said ailerons:

to said symmetric position partially deflected downwards corresponding to a maximum fineness for the aircraft, if a 1 appears therein; or to said symmetric position at least substantially close to that being in continuation of said wings and providing a minimum drag for the ailerons, if a 0 appears therein.

Thanks to the previous devices, the method according to the present invention could be easily implemented in said aircraft.

This invention thus further relates to an aircraft implementing said method of this invention.

BRIEF DESCRIPTION OF THE DRAWINGS

The figures of the appended drawing will better explain how this invention can be implemented. In these Figures, like reference numerals relate to like components.

FIG. 4 illustrates, in three successive phases I, II and III, the takeoff of the airplane of FIGS. 1 and 2, the phase represented on FIG. 2 corresponding to the phase II of FIG. 4 and phases I and II providing the takeoff run of said jumbo jet.

FIG. 5 schematically illustrates the usual position of the ailerons of said jumbo jet during the phases I to III of FIG. 4.

FIG. 6 schematically illustrates the position of the ailerons of said jumbo jet according to the present invention during the quickest part of the phase I and during the phase II of FIG. 4.

DETAILED DESCRIPTION

Figure 1:
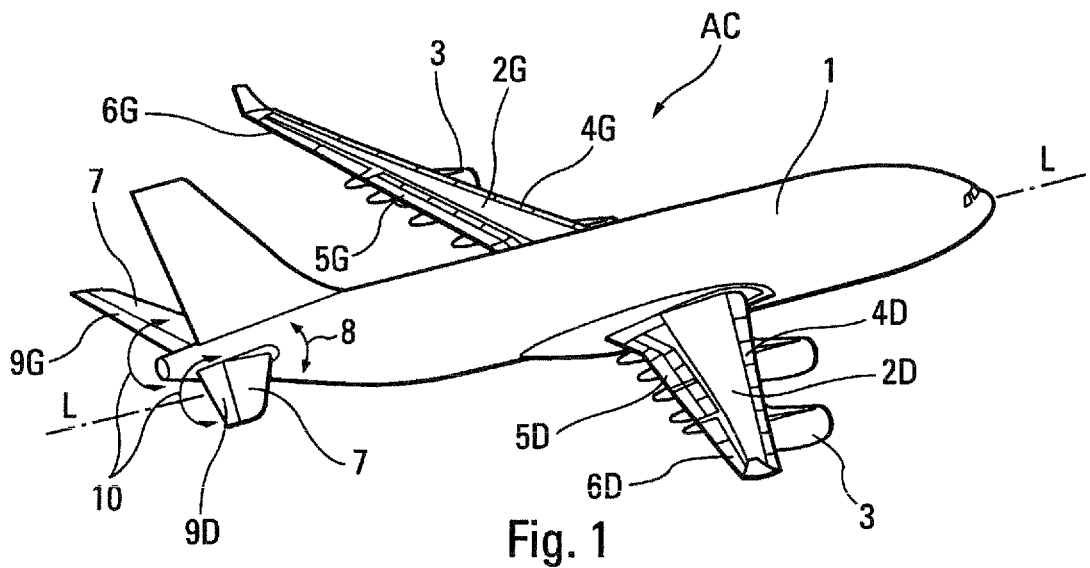
FIG. 1 schematically shows, in top and rear perspective, a jumbo jet being able to implement the present invention.
Figure 2:
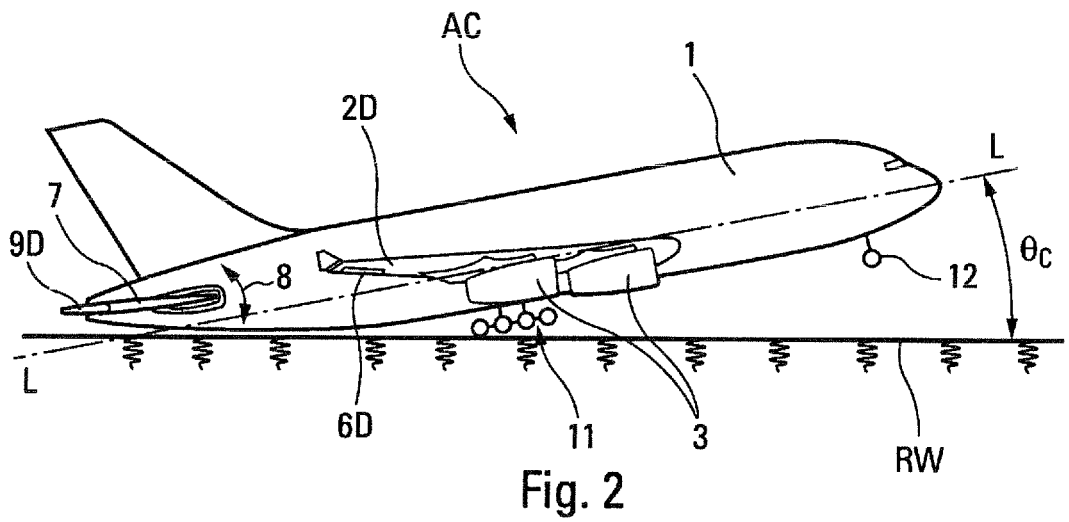
FIG. 2 illustrates, in a schematic side view, the jumbo jet of FIG. 1 during a takeoff phase.

On FIGS. 1, 2 and 4, the flaps, the slats, the rudders, the ailerons, the trimmable horizontal stabilizer, as well as the other mobile aerodynamic surfaces of the jumbo jet, are shown in a retracted position for clarity sake of the drawings. It will be easily understand that during phases I, II and III of FIG. 4, at least some of such surfaces are, on the contrary, in an extended position, although represented in a retracted position.

The jumbo jet AC, schematically shown by FIGS. 1 and 2, has a longitudinal axis L-L and comprises a fuselage 1 and two symmetric wings 2G and 2D. Said wings carry engines 3 and a plurality of leading edge slats 4G, 4D and of trailing edge flaps 5G, 5D. Moreover, at the end of the wings 2G, 2D there are located ailerons 6G and 6D, respectively. As schematically shown on FIGS. 4 and 5, said ailerons 6G and 6D are rotationally jointed at the rear of said wings 2G and 2D, respectively, their downwards rotation stroke $\alpha$ being able to take the maximum value $\alpha_M$, counted from their position for which they are in continuation of the corresponding wing 2G or 2D. Such latter position, being shown on FIG. 6 and for which the stroke $\alpha$ is equal to 0°, is generally that for which the drag generated by said ailerons 6G and 6D is minimum. However, it could occur that the minimum drag position of the ailerons 6G and 6D is not exactly the position corresponding to a equal to 0°, but a proximate position for which the stroke $\alpha$ is close to 0°, but not exactly nil. Thus, hereinafter it is considered that the minimum drag position of the ailerons 6G and 6D corresponds to a value $\alpha_0$ of the stroke $\alpha$, such a value $\alpha_0$ being nil or close to zero.

At the rear of the fuselage 1, the airplane AC comprises a horizontal stabiliser 7 being able to be set in a tilting condition, as illustrated by the double arrow 8. At the rear edge of said trimmable horizontal stabilizer 7, there are jointed rudders 9G, 9D respectively, able to rotate with relation to said stabilizer 7, as illustrated by the double arrows 10.

Figure 3:
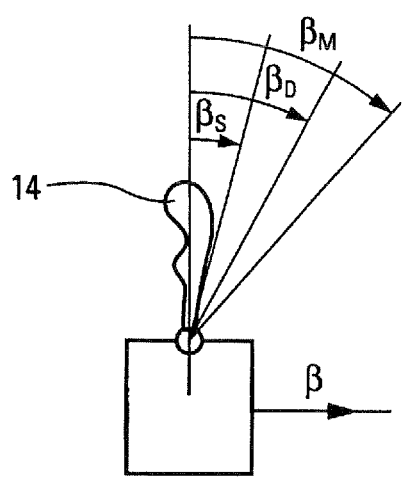
FIG. 3 schematically illustrates the nose-up tilting of said steering joystick.

As known, and as illustrated by FIG. 3, the airplane AC is controlled in a pitching condition by a tilting steering joystick 14, available to the pilot, operating said trimmable horizontal stabilizer 7 and said rudders 9G, 9D. In the nose-up direction, the steering joystick 14 generates to this end a nose-up order $\beta$ addressed to the actuators (not shown) of said trimmable horizontal stabilizer 7 and of said rudders 9G, 9D. The maximum nose-up stroke of the steering joystick 14 is referred to as $\beta_M$, while the nose-up position generally used by the pilot during a takeoff (phase III of FIG. 4) is referred to as $\beta_0$ and corresponds to about $2\beta_M/3$.

The airplane AC further comprises a main landing gear 11, as well as a front gear 12.

FIG. 4 shows three phases I, II and III of the takeoff of said airplane allowing an illustration of the method according to the present invention.

In the phase I, the airplane AC runs on the takeoff runway RW accelerating with a view to taking off, said main gear 11 being then compressed by the mass of said airplane AC and by the ground effect.

During such acceleration phase I, the leading edge slats 4G, 4D and the trailing edge flaps 5G, 5D are usually extended (not shown), the trimmable horizontal stabilizer 7 is tilted to be nosed-up by the action of the pilot on the steering joystick and the rudders 9G, 9D are, for example, in their position aerodynamically extending said trimmable horizontal stabilizer 7. In such a usual configuration, the assembly of said trimmable horizontal stabilizer 7 and of rudders 9G, 9D generates a nose-up aerodynamic force producing a nose-up pitching moment for the airplane AC, the configurations of the leading edge slats 4G, 4D and of the trailing edge flaps 5G, 5D allowing to optimize the fineness (lift/drag ratio) of the airplane AC.

Usually, in such an acceleration phase I, the ailerons 6G, 6D are also used for optimizing such fineness and they are symmetrically deflected downwards, as illustrated on FIG. 5. To this end, they occupy a partially position being deflected downwards, defined by a value $\alpha_F$ of the stroke $\alpha$, lower than the maximum stroke $\alpha_M$.

It will be easily understood that such a position of the ailerons 6G, 6D partially deflected downwards, although favourable to the fineness of the airplane AC, actually results in a significant drag, generated by said ailerons and negatively impacting the performance of the airplane AC during the phase I.

Thus, according to the invention, in order to overcome such a drawback, as soon as, in the phase I, the velocity V of the airplane AC has exceeded a predetermined velocity threshold $V_s$ (for example, equal to 40 kt) and the pilot has shown his intention to take off (which can be materialized by the fact that the tilting $\beta$ of the nose-up joystick 14 has exceeded a predetermined threshold $\beta_s$, for example, equal to $\beta_M/3$), the ailerons 6G, 6D are brought back in their optimum fineness position ($\alpha=\alpha_F$), represented on FIG. 5, to their minimum drag position ($\alpha=\alpha_0$), represented by FIG. 6.

In the takeoff phase II (see also FIG. 2), the pilot of the airplane AC, via the steering joystick 14, actuates the rudders 9G, 9D and/or the trimmable horizontal stabilizer 7 (not shown), to cause the assembly of such rudders 9G, 9D and of such a stabilizer 7 to generate a nose-up force and a nose-up pitching moment being adapted to impart to the airplane AC a controlled balance $0_C$ with a value favourable to the takeoff of the latter. In such a phase II, in order to minimize the drag generated by the ailerons 6G, 6D, the latter remain in their position taken in the phase I and represented on FIG. 6.

With such an aileron position, the airplane AC continues its acceleration run until the latter takes off and the main gear 11 is fully off ballast, as shown by the phase III of FIG. 4.

It will be easily understood that the reduction of the drag provided by the ailerons 6G, 6D in a minimum drag position (FIG. 6) in the final part of the phase I and during the phase II, facilitates the takeoff of the airplane AC and reduces the takeoff run thereof with respect to the situation where said ailerons 6G, 6D would remain in their position being partially deflected of FIG. 5.

It is further to be noticed that, in order to facilitate the climbing performance of the airplane AC during the takeoff phase III, it is required to bring back the ailerons 6G, 6D from their minimum drag deflection position, defined by the value $\alpha_0$ (FIG. 6), to their downward partial deflection position, defined by the value $\alpha_F$ and corresponding to the optimum fineness (FIG. 5).

Thus, from the foregoing, it is seen that the minimum drag position of the ailerons 6G, 6D should only interfere during the phases I and II, when the airplane is on the ground, that the velocity V thereof is higher than said threshold $V_s$ and that the steering joystick is deflected by an angle $\beta$ lower than the threshold $\beta_S$.

On the other hand, as soon as the airplane AC leaves the runway RW (which is, for example, detected by the main gear 11 being off ballast), the ailerons 6G, 6D should leave their minimum drag deflection $\alpha_0$ so as to take their maximum fineness deflection $\alpha_F$.

Figure 7:
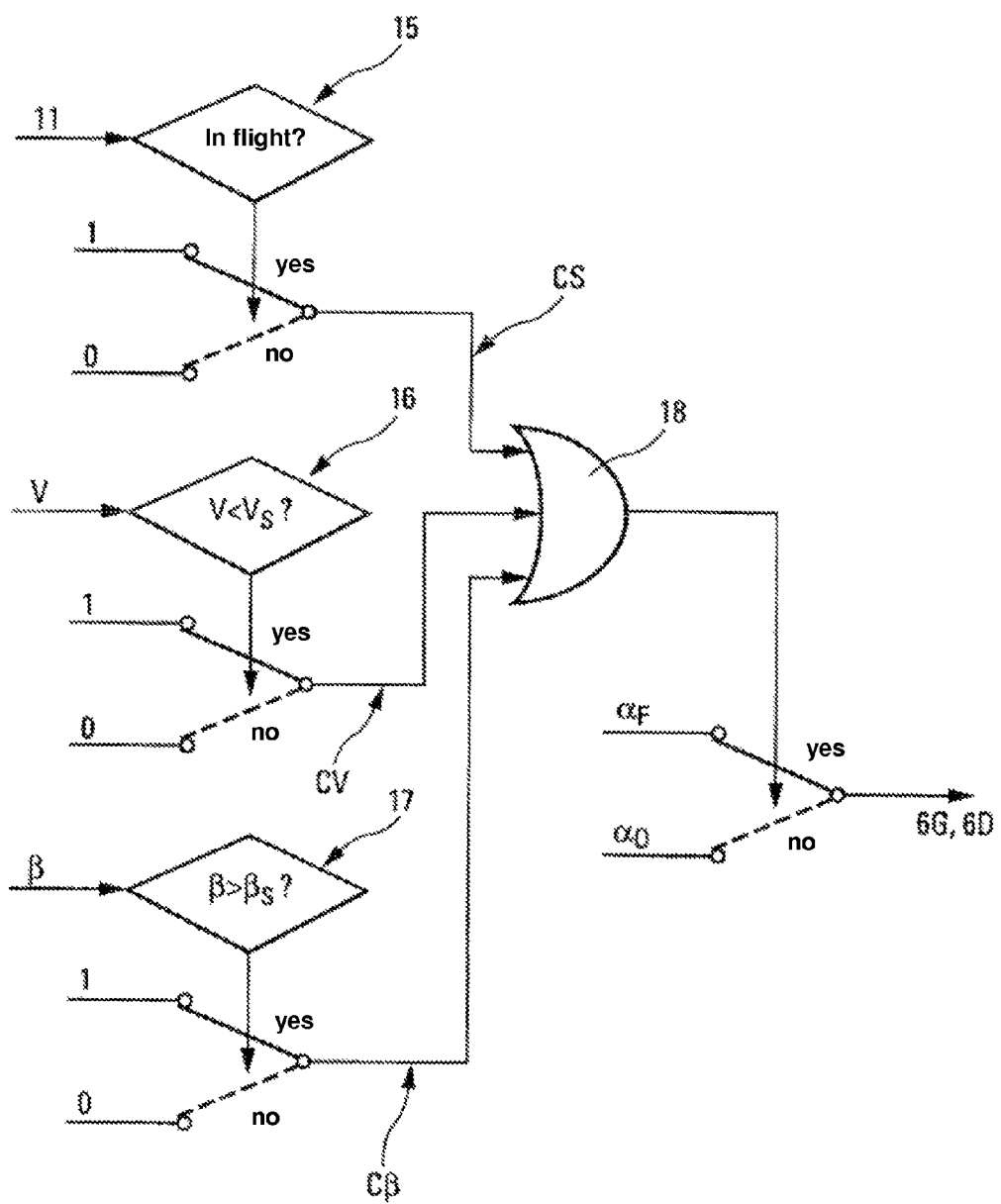
FIG. 7 is the block diagram of the implementation of the method according to the present invention.

The block diagram on FIG. 7 corresponds to a preferred embodiment of the present invention. On this FIG. 7, there are shown:
- a logic device 15, receiving from the main landing gear 11 a piece of information concerning its compression or vacuum relief condition, so that the logic device 15 can infer therefrom whether the airplane AC is on the ground (the gear 11 is then compressed) or on flight (the gear 11 is then extended) and delivers at the outlet thereof a ground criterion CS being equal to 1 if the airplane is on flight and to 0 if the airplane is on the ground;
- a comparator 16, receiving the running velocity V of the aircraft AC, knowing the velocity threshold $V_s$ and delivering at the outlet thereof a velocity criterion CV, having its value equal to 1 if the velocity V is lower than the threshold V, and to 0 if the velocity V is higher than said threshold $V_s$;
- a comparator 17, receiving the nose-up order $\beta$ generated by the steering joystick 14, knowing the nose-up tilting threshold $\beta_S$ and delivering at the outlet thereof a joystick criterion C$\beta$ having its value equal to 1 if the tilting $\beta$ higher than the threshold $\beta_S$ and to 0 if the tilting $\beta$ is lower than the threshold $\beta_S$; and
- an OR gate (or similar) 18 at all three inputs of which there are respectively applied the criteria CS, CV, and C$\beta$ and controlling the ailerons 6G, 6D at a symmetric deflection $\alpha_F$ if the outlet thereof is at 1 and at the symmetric deflection $\alpha_0$ if the outlet thereof is at 0.

It is thus easily seen that the minimum drag position $\alpha_0$ (FIG. 6) of the ailerons 6G, 6D is controlled if the three following conditions are met at the same time:
the airplane AC is on the ground, and
the running velocity V is higher than the velocity threshold $V_s$, and
the steering joystick 14 is nose-up deflected by an angle $\beta$ lower than the tilting threshold $\beta_S$.

On the other hand, the ailerons 6G, 6D are controlled at the maximum fineness position $\alpha_F$, if any of the following conditions is met:
the airplane AC is on flight, or
the running velocity V is lower than the velocity threshold $V_s$, and
the steering joystick 14 is nose-up deflected by an angle $\beta$ higher than the tilting threshold $\beta_S$.

It is to be noticed that the logic illustrated by FIG. 7 could be easily implemented in the on-board calculators of the airplane AC, which, usually, have available information regarding the nose-up deflection $\beta$ of the steering joystick 14, the running velocity V of the airplane AC and whether the airplane is on the ground or on flight.

The invention claimed is:

1. A method for reducing the takeoff run of an aircraft (AC) provided with at least one steering joystick (14), with ailerons (6G, 6D) carried by the wings (2G, 2D) of said aircraft and with mobile aerodynamic rudder surfaces (7, 9G, 9D), such a takeoff run during which said aircraft (AC) runs on a takeoff runway (RW) while accelerating and at the end of which the pilot of said aircraft communicates to said steering joystick (14) a tilted nose-up takeoff position ($\beta_D$) so that said mobile aerodynamic rudder surfaces (7, 9G, 9D) cause said aircraft (AC) to take off, comprising the steps of:
determining a nose-up tilting threshold ($\beta_s$) of said steering joystick (14), lower than said takeoff position ($\beta_0$); and
controlling said ailerons (6G, 6D) so that they take:
a symmetric position ($\alpha_F$) deflected downwards corresponding to a maximum fineness for said aircraft, if the nose-up tilting ($\beta$) of said steering joystick (14) is higher than said tilting threshold ($\beta_s$), and
a symmetric position ($\alpha_0$) at least substantially close to that being in continuation of said wings (2G, 2D) and providing a minimum drag for said ailerons, if the nose-up tilting of said steering joystick is lower than said tilting threshold ($\beta_s$);
establishing a velocity threshold ($V_s$) for the aircraft running on said takeoff runway (RW) and in that said ailerons (6G, 6D) take:
said symmetric position ($\alpha_F$) deflected downwards corresponding to a maximal fineness for said aircraft, if the nose-up tilting ($\beta$) of said steering joystick is higher than said tilting threshold ($\beta_s$) or if the running velocity (V) of said aircraft is lower than said velocity threshold ($V_s$) and
said symmetric position ($\alpha_0$), at least substantially close to that being in continuation of said wings and providing a minimum drag for said ailerons (6G, 6D), if the nose-up tilting ($\beta$) of said steering joystick (14) is lower than said tilting threshold ($\beta_s$) and if the running velocity (V) of said aircraft is higher than said velocity threshold ($V_s$);
establishing:
a ground criterion (CS), being equal to 1 when said aircraft is on flight and being equal to 0 when said aircraft is on the ground;
a velocity criterion (CV), being equal to 1 when the running velocity (V) of said aircraft is lower than said velocity threshold ($V_s$) and being equal to 0 when said running velocity (V) is higher than said velocity threshold ($V_s$); and a steering joystick criterion, being equal to 1 if the nose-up tilting (β) of said joystick is higher than said tilting threshold (β3) and being equal to 0 if said nose-up tilting (β) is lower than said tilting threshold ($\beta_s$); and addressing each of the three criteria (CS, CV, Cβ) at a respective input of an OR logic gate or similar (18), having its outlet controlling said ailerons (6G, 6D):

to said symmetric position ($\alpha_F$) deflected downward corresponding to a maximum fineness for the aircraft, if a 1 appears therein; or to said symmetric position ($\alpha_0$) at least substantially close to that being in continuation of said wings (2G, 2D) and providing a minimum drag for the ailerons, if a 0 appears therein.

2. The method according to claim 1, wherein said nose-up tilting threshold ($\beta_S$) corresponds at least approximately to one third of the maximum nose-up stroke ($\beta_M$) of said steering joystick (14).

3. The method according to claim 1, wherein said velocity threshold ($V_s$) is equal to a few tens of knots.

4. The method according to claim 3, wherein said velocity threshold ($V_s$) is at least approximately equal to 40 kts.

5. An aircraft implementing the method according to claim 1.

\* \* \* \* \*